US00RE44673E

(19) United States
(12) Reissued Patent
Albenda

(10) Patent Number: US RE44,673 E
(45) Date of Reissued Patent: Dec. 31, 2013

(54) PORTABLE PRESENTATION AND DISPLAY BOARDS

(76) Inventor: Abraham Albenda, Brooklyn, NY (US)

(21) Appl. No.: 13/335,311

(22) Filed: Dec. 22, 2011

Related U.S. Patent Documents

Reissue of:
(64) Patent No.: 7,823,309
Issued: Nov. 2, 2010
Appl. No.: 11/609,207
Filed: Dec. 11, 2006

U.S. Applications:
(63) Continuation-in-part of application No. 10/723,077, filed on Nov. 26, 2003, now abandoned.

(60) Provisional application No. 60/445,170, filed on Feb. 5, 2003, provisional application No. 60/775,535, filed on Feb. 22, 2006.

(51) Int. Cl.
*G09F 15/00* (2006.01)
*G09F 1/00* (2006.01)
*G09F 1/08* (2006.01)

(52) U.S. Cl.
USPC ..... 40/610; 40/124.09; 40/124.12; 40/539; 40/124.191; 229/132; 229/116.1; 206/736; 206/745; 206/749

(58) Field of Classification Search
USPC ..... 40/610, 124.09, 124.12, 539, 124.191; 229/132, 116.1; 206/736, 745–749
See application file for complete search history.

(56) References Cited

U.S. PATENT DOCUMENTS 611,063 A * 9/1898 Davis ..... 206/748
1,795,613 A 3/1931 Moehle
2,102,079 A 12/1937 Keppler
2,142,547 A 1/1939 Anderson
2,142,548 A 1/1939 Anderson
2,274,765 A 3/1942 Zalkind
2,406,729 A 8/1946 White et al.
2,631,046 A 3/1953 Stephens
2,784,779 A 3/1957 Knipfer et al.
3,434,648 A * 3/1969 Du Barry, Jr. ..... 229/122.26
3,469,335 A 9/1969 Leigh
3,875,693 A 4/1975 Pelkey
3,973,341 A 8/1976 Kent, Jr.
4,531,564 A 7/1985 Hanna
4,676,383 A 6/1987 Sheffer
4,711,046 A 12/1987 Herrgord
4,759,520 A 7/1988 Levine
4,794,712 A 1/1989 Wood
4,949,490 A * 8/1990 Miller ..... 40/605
5,129,609 A 7/1992 Tobin
5,131,448 A 7/1992 Miller
(Continued)

*Primary Examiner* — Syed A Islam
(74) *Attorney, Agent, or Firm* — Holtz, Holtz, Goodman & Chick, PC

(57) ABSTRACT

Display device including a unitary, rigid sheet defining a left center panel, a right center panel pivotally connected to the left center panels, a left side panel pivotally connected to the left center panel and a right side panel pivotally connected to the right center panel. Vertically extending separation lines are formed on a rear planar layer without penetrating or cutting a front planar layer so that the panels are able to pivot about vertical axes. Fold lines may be formed opposite the separation lines on the front planar layer to facilitate folding the sheet whereby the fold lines define the vertical axes about which the panels pivot. Folding of the sheet provides a compact configuration which enables the display device to be easily carried.

19 Claims, 12 Drawing Sheets

(56) References Cited

U.S. PATENT DOCUMENTS

| | | | | |
|---|---|---|---|---|
| 5,293,705 | A | 3/1994 | Wood | |
| 5,570,735 | A | 11/1996 | Chu | |
| 5,611,384 | A | 3/1997 | Carter | |
| 5,775,919 | A | 7/1998 | Gardner | |
| 5,911,522 | A | 6/1999 | Wood | |
| 5,927,502 | A | 7/1999 | Hunter | |
| 5,944,252 | A * | 8/1999 | Connelly et al. | 229/132 |
| 6,155,325 | A | 12/2000 | Schirer | |
| 6,189,594 | B1 | 2/2001 | Carter | |
| 6,237,668 | B1 | 5/2001 | Hitchings | |
| 6,371,190 | B1 * | 4/2002 | Owens | 160/135 |
| 6,752,280 | B2 | 6/2004 | Dye | |
| 6,775,915 | B2 | 8/2004 | Stephens | |
| 7,159,351 | B2 * | 1/2007 | Sparkowski | 40/610 |
| 2002/0073598 | A1 | 6/2002 | Wright | |
| 2004/0231203 | A1 * | 11/2004 | Dobelbower et al. | 40/124.09 |

* cited by examiner

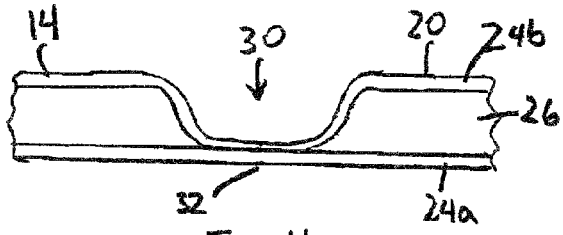
Fig. 4
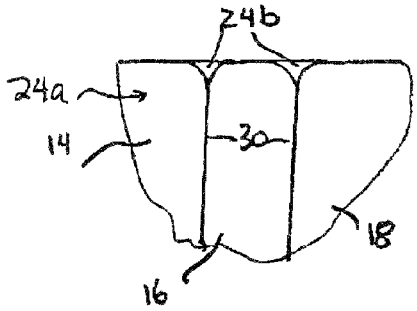
Fig. 8A
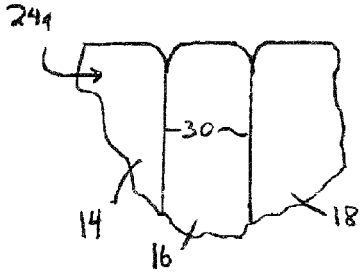
Fig. 8B
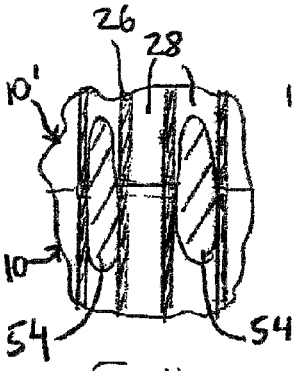
Fig. 11
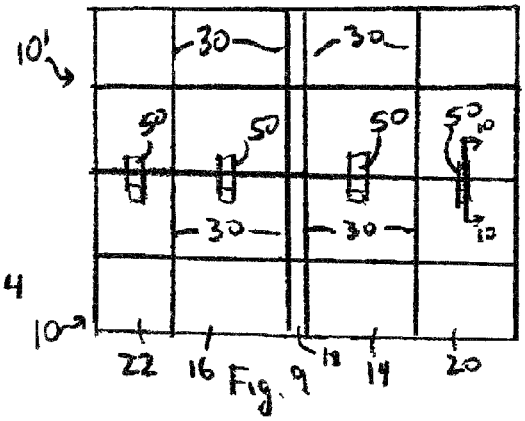
Fig. 9
Fig. 10
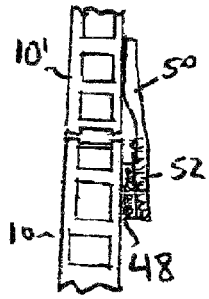

Fig. 14
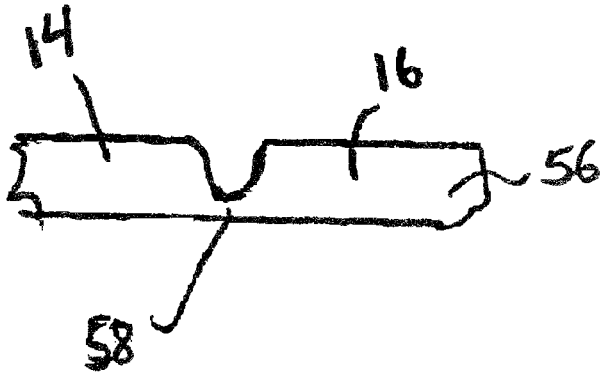
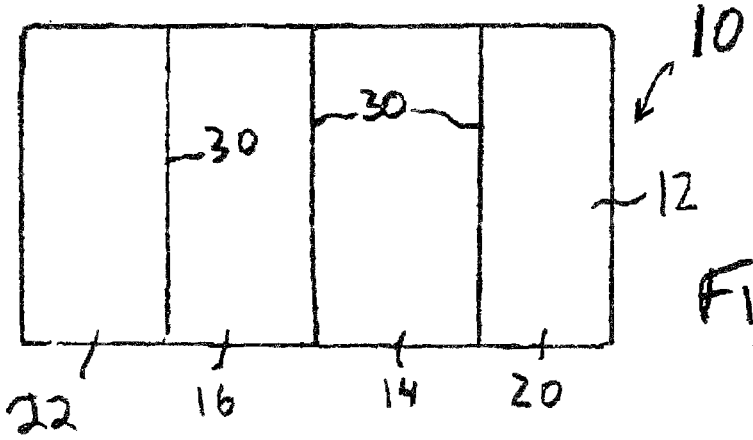
Fig. 15
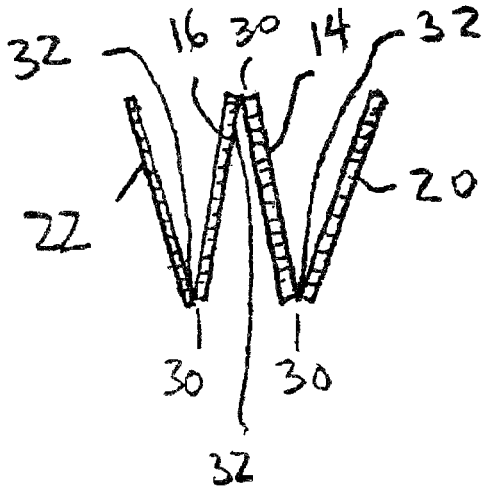
Fig. 16

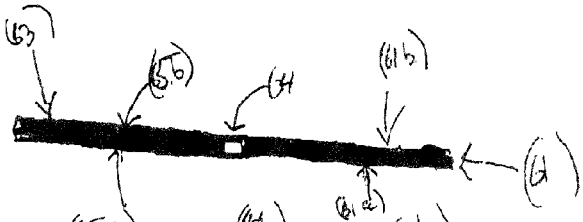
FIG. 20a
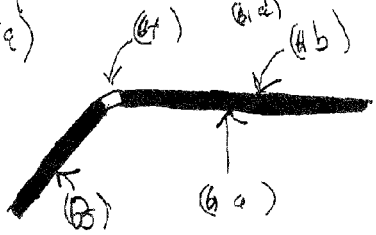
FIG. 21a
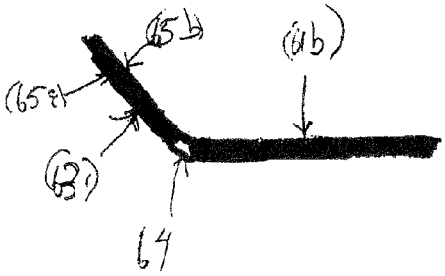
FIG. 22a
FIG. 24a
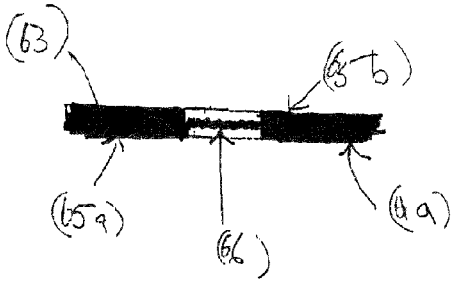
FIG. 25a
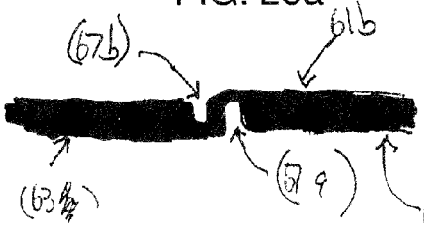
FIG. 26a
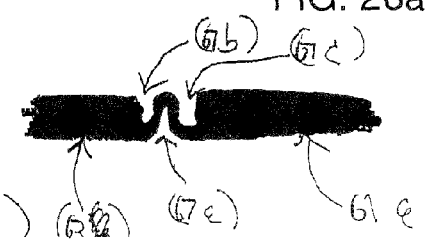

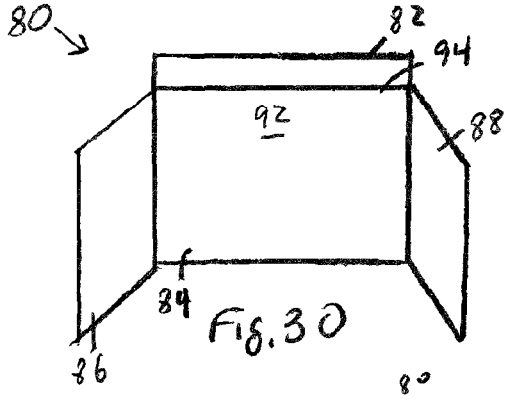
Fig. 30
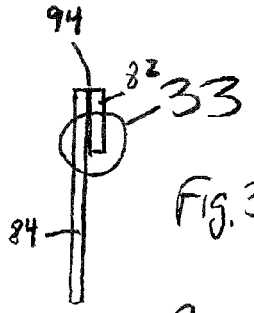
Fig. 32
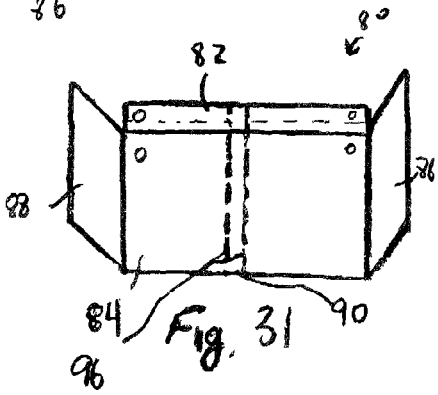
Fig. 31
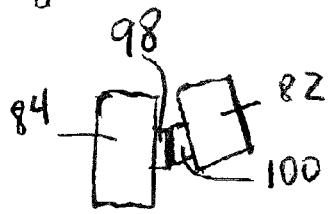
Fig. 33
Fig 34
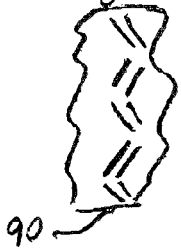
Fig. 35
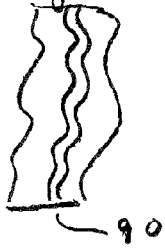
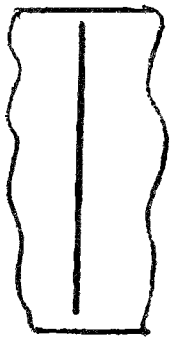
Fig. 36
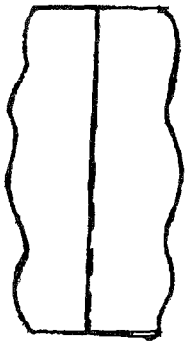
Fig. 37
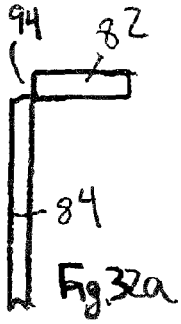
Fig. 32a

PORTABLE PRESENTATION AND DISPLAY BOARDS

Matter enclosed in heavy brackets [ ] appears in the original patent but forms no part of this reissue specification; matter printed in italics indicates the additions made by reissue.

CROSS REFERENCE TO RELATED APPLICATIONS

This application *is a reissue application of U.S. patent application Ser. No. 11/609,207 filed Dec. 11, 2006, now U.S. Pat. No. 7,823,309, which* claims priority under 35 U.S.C. §119(e) of U.S. provisional patent application Ser. No. 60/775,535 [field] *filed* Feb. 22, 2006*, now expired,* and is a continuation-in-part of U.S. patent application Ser. No. 10/723,077 filed Nov. 26, 2003 now abandoned which claims priority under 35 U.S.C. §119(e) of U.S. provisional patent application Ser. No. 60/445,170 filed Feb. 5, 2003, *now expired,* the entire contents of all of which are incorporated herein by reference.

FIELD OF THE INVENTION

The present invention relates generally to a portable display and more particularly to a portable display for use in educational fields such as to display educational material, students' classroom work and home work, art projects and projects for science fairs and the like.

Additionally, the present invention relates to a portable display that can be used by teachers in lessons and by other professionals in presentations.

BACKGROUND OF THE INVENTION

Primary and secondary schools often conduct various science fairs and the like which require students to conduct or investigate an aspect of science and present a report on the same. Typically, students use rigid poster boards to display materials related to their projects. One problem with such rigid poster boards are their inflexibility which results in difficulties in carrying the poster boards.

Therefore, display devices have been developed which are foldable. For example, U.S. Pat. Nos. 4,794,712, 5,293,705 and 5,911,522 describe a portable display device which includes three panels, namely, a center panel and two side panels, one on each side of the center panel. The side panels have a width one-half of the width of the center panel and are hinged to the center panel so that they can be folded against the center panel to thereby reduce the size of the display device in half and make carrying the display device easier. When expanded into the display configuration, the display device has a width equal to twice the width of the center panel. In spite of the reduction in the width of the display device for carrying purposes, the display device still has a rather large width, which is the width of the center panel, and is therefore difficult to carry.

Accordingly, it would be desirable to have a display device which is collapsible into a more compact form which is easy to carry, especially for schoolchildren.

OBJECTS AND SUMMARY OF THE INVENTION

It is an object of the present invention to provide a new and improved portable display device which is easy to carry.

It is another object of the present invention to provide a new and improved portable display for use in educational fields such as to display educational material, students' classroom work and home work, art projects and projects for science fairs and the like.

It is yet another object of the present invention to provide a new and improved lightweight display device.

It is still another object of the present invention to provide a new and improved display device which is easily collapsed and folded into a compact form.

In order to achieve these objects and others, a first embodiment of a display board in accordance with the invention includes a substantially planar center panel, a substantially planar left side panel pivotally connected to a left edge of the center panel, a substantially planar right side panel pivotally connected to a right edge of the center panel, and an arrangement for enabling the left and right side panels to rotate [almost 360°] relative to the center panel. As such, the display board is reversible in that both the front surfaces of the panels and the rear surfaces of the panels each constitute a display surface or presentation surface.

In one embodiment, the material constituting the front surface of the center, left side and right side panels has at least one different property than the material constituting the rear surface of the center, left side and right side panels, such properties including color, magnetic capability, the ability to have ink or markers washed off or remain permanent thereon, texture, etc.

In one embodiment, each of the right and left side panels has a width about 12 the width of the center panel to be foldable against the center panel. The center panel is preferably devoid of partitions, score lines, cut lines and slits.

The center, left side and right panels may each include a pair of sheets of material and flutes of corrugations or solid material between the sheets. The rotation enabling arrangement can thus constitute a gap between the flutes or solid material and defined by the sheets of material. Alternatively, the rotation enabling arrangement can be a crushed portion of the flutes between the sheets of material.

As another alternative, the rotation enabling arrangement may be a first deep or cut score opening toward a front surface of the display board and a second deep or cut score opening toward a rear surface of the display board and arranged proximate the first deep or cut score. The proximity of the deep or cut scores enables pivotal movement of the side panels in both directions relative to the center panel. Optionally, a third deep or cut score is provided opening toward the rear surface of the display board and arranged proximate the first deep or cut score and on an opposite side of the first deep or cut score from the second deep or cut score.

When forming the deep or cut scores or other types of scores, they can terminate at a distance from edges of the display board such that edges of the display board are uncut and contiguous.

Another embodiment of a display board in accordance with the invention includes a substantially planar center panel including a seam in an approximate middle region which enables the center panel to be folded, a substantially planar left side panel pivotally connected to a left edge of the center panel and having a width about ½ the width of the center panel such that the left side panel is foldable against the center panel, a substantially planar right side panel pivotally connected to a right edge of the center panel and having a width about ½ the width of the center panel such that the right side panel is foldable against the center panel, and a flap pivotally connected to an upper edge of the center panel and arranged to pivot rearward to stabilize the display board when the left and right side panels are arranged at an acute angle relative to the center panel. The flap has a width equal to or less than a width of the center panels such that the flap does not extend alongside the left or right side panels. The flap has a first portion on one side of the seam and a second portion on the other side of the seam such it traverses the seam. The seam may be formed by a pair of parallel cut scores or deep scores optionally angled to one another or wavy, and the seam may only intermittently extend through the flap.

When the center, left side and right side panels and the flap are formed from a common substrate, a cut score, deep score or slit may be formed in a front or rear surface of and at the upper edge of the center panel to enable the pivotal movement of the flap. Preferably, the cut score, deep score and/or slit is/are formed to enable rearward pivotal movement of the flap. However, formation of these to enable forward pivotal movement of the flap is also a possibility.

An arrangement for attaching the flap to a rear surface of the center panel may be provided and can include a first mechanism arranged on the rear surface of the center panel and a second mechanism arranged on a rear surface of the flap and which cooperates with the first attachment mechanism. Alternatively, a single attachment mechanism is provided, for example, glue or another adhesive, on only one of the opposite surfaces. As another alternative, a tab and cooperating slit may be provided on the flap and center panel.

Another embodiment of a display device in accordance with the invention includes a unitary, rigid sheet of plastic, corrugated plastic, corrugated cardboard, or other appropriate material defining a left center panel, a right center panel pivotally coupled to the left center panel, a left side panel pivotally connected to the left center panel and a right side panel pivotally connected to the right center panel. The right and left center panels may be indirectly pivotally coupled to one another via the formation of a spine panel therebetween to which both the left and right center panels are pivotally coupled. To partition the sheet into the panels, vertically extending separation lines are formed in or on a rear planar layer without penetrating or cutting a front planar layer so that the panels are able to pivot about vertical axes.

The sheet may be corrugated or solid. When the sheet is solid, the separation lines would constitute elongate portions having a reduced thickness or living hinges.

Fold lines may be formed opposite the separation lines on the front planar layer to facilitate folding the sheet whereby the fold lines define the vertical axes about which the panels pivot. Folding of the sheet provides a compact configuration which enables the display device to be easily carried. In some embodiments, the fold lines in the front planar layer may be lightly scored or serrated to enable easier pivotal movement of the panels about the fold lines.

The sheet is optionally formed from the front and rear substantially planar layers of plastic or other appropriate materials which are connected by parallel ribs to define cavities. The ribs can extend vertically or horizontally so that the separation lines between the panels can be either perpendicular or parallel to the corrugation of the sheet.

In addition to the vertically extending separation lines, the rear planar layer of the sheet may be provided with one or more horizontally extending separation lines to separate the sheet into vertical sections and enable the vertical sections to pivot about a horizontal axis. This provides the sheet with a second compact configuration.

Corners of the rear and/or front planar layers defined by the upper and lower edges of the planar layers and the separation lines, may be rounded to prevent damage to the display board or injury to people caused by the otherwise sharp edges of the planar layers.

BRIEF DESCRIPTION OF THE DRAWING

The invention, together with further objects and advantages thereof, may best be understood by reference to the following description taken in conjunction with the accompanying drawings, wherein like reference numerals identify like elements and wherein:

FIG. 4 is a fragmentary side view of another embodiment of a separation line running perpendicular to the corrugation in the display device in accordance with the invention.

FIG. 8A is a fragmentary rear view of one embodiment of the display device in accordance with the invention.

FIG. 8B is a fragmentary rear view of another embodiment of the display device in accordance with the invention.

FIG. 9 is a rear view of two display devices in accordance with the invention arranged one on top of another.

FIG. 10 is a cross-sectional view taken along the line 10-10 of FIG. 9.

FIG. 11 is a cross-sectional view showing another arrangement of two display devices in accordance with the invention, one on top of another.

FIG. 14 is a fragmentary side view of another embodiment of a display device in accordance with the invention.

FIG. 15 is a rear view of another embodiment of the portable display device shown in FIG. 1A.

FIG. 16 is a top view of the portable display device shown in FIG. 15 in a compact, carrying configuration.

FIGS. 20 and 20a are top view showing one gap between adjacent panels of the display board shown in FIG. 17.

FIGS. 21, 21a, 22 and 22a are top views showing the adjacent panels of the display board rotated in both directions with the gap as shown in FIGS. 20 and 20a.

FIGS. 24 and 24a are top view showing yet another gap between adjacent panels of the display board shown in FIG. 17.

FIGS. 25 and 25a are top views showing yet another gap or score or cut score between adjacent panels of the display board shown in FIG. 17.

FIGS. 26 and 26a are top views showing yet another gap or score or cut score between adjacent panels of the display board shown in FIG. 17.

FIG. 30 is a front view of another embodiment of a display board in accordance with the invention.

FIG. 31 is a rear view of the display board shown in FIG. 30.

FIGS. 32 and 32a are side views of the center panel of the display board shown in FIG. 30.

FIG. 33 is an enlarged portion designated 33 in FIG. 32.

FIGS. 34 and 35 are views of score lines for use, e.g., in seams of any display board in accordance with the invention.

FIGS. 36 and 37 show possible score lines for use in any display board in accordance with the invention.

DETAILED DESCRIPTION OF THE INVENTION

Figure 1A:
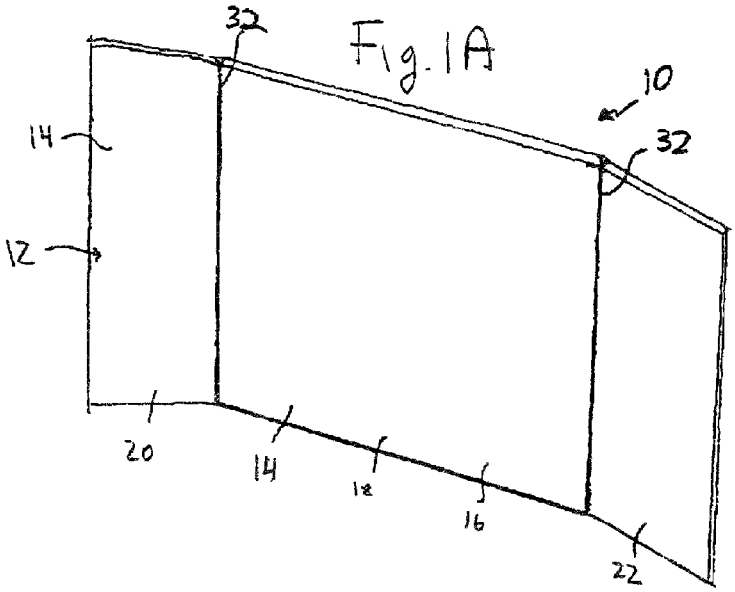
FIG. 1A is a front, perspective view of a portable display device in accordance with the invention in an open or display position.
Figure 1B:
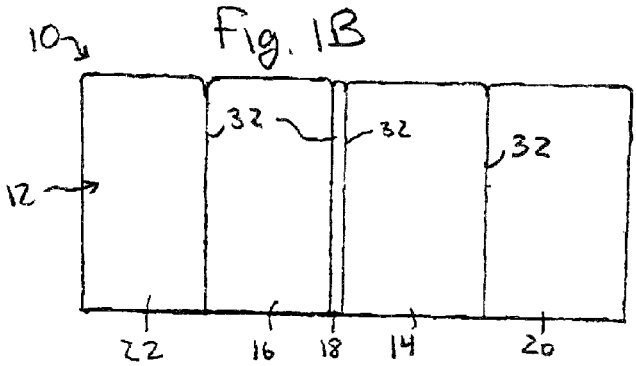
FIG. 1B is a front view of another embodiment of the portable display device shown in FIG. 1A.

Referring to the accompanying drawings wherein like reference numerals refer to the same or similar elements, FIGS. 1A and 1B show a display device in accordance with the invention which is designated generally as 10 and comprises a single sheet 12 of corrugated plastic or other appropriate material separated into a plurality of connected panels, namely, a left center panel 14, a right center panel, 16, a spine panel 18 arranged between the left and right center panels 14,16, a left side panel 20 connected to the left center panel 14 and a right side panel 22 connected to the right center panel 16.

The left center panel 14 is pivotally coupled to the right center panel 16 via the spine panel 18 (i.e., an indirect pivotal coupling) so that the left and right center panels 14, 16 are rotatable relative to one another. As discussed below with reference to FIGS. 15 and 16, the spine panel 18 may be eliminated with the result that the left center panel 14 is directly pivotally connected to the right center panel 16.

Figure 2:
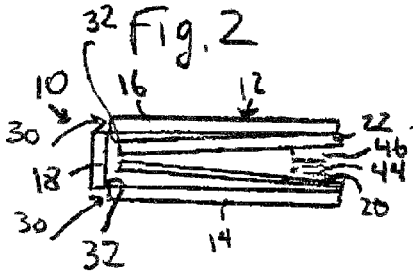
FIG. 2 is a top view of the portable display device shown in FIG. 1D in a compact, carrying configuration.

The separation of the sheet 12 into the different panels is designed to enable the sheet 12 to be easily folded between the open or display configuration shown in FIG. 1A and the closed or compact configuration shown in FIG. 2, e.g., for carrying and transportation purposes. The folding may be either an inward folding wherein the lateral edges of the sheet 12 are brought inward to be situated between other parts of the sheet 12, described with reference to FIG. 2, or an outward folding wherein the lateral edges are not brought between other parts of the sheet 12, described below with reference to FIGS. 15 and 16. The outward folding allows for various sized panels substantially without dimensional limitations.

As to the inward folding, the widths of the panels 14, 16, 18, 20, 22 must be dimensioned to allow the side panels 20, 22 to fold into a space between the right and left center panels 14, 16. Left side panel 20 thus has a shorter width than the width of the left center panel 14 as it will be folded up against the left center panel 14 when in the compact configuration, i.e., a planar surface of the left side panel 20 will face a planar surface of the left center panel 14. Similarly, the right side panel 22 has a shorter width than the width of the right center panel 16 as it will be folded up against the right center panel 16 when in the compact configuration, i.e., a planar surface of the right side panel 22 will face a planar surface of the right center panel 16. The left and right center panels 14, 16 preferably have the same width. The width of the spine panel 18 is selected to enable the formation of sufficient separation between the left and right center panels 14, 16 when in the compact configuration to accommodate the thickness of the left and right side panels 20,22.

In the display configuration shown in FIG. 1A, the panels 14, 16, 18, 20, 22 may be positioned to provide the sheet 12 with a flat configuration so that display materials can be affixed to a front, planar surface of the sheet 12 over any number of the panels. The sheet 12 could also be attached to a wall or leaned against a blackboard. The display device 10 might also include a support mechanism attached to the rear surface to enable the display device 10 to be reliably self-standing.

It is also possible to fold or bend one or both of the side panels 20, 22 relative to the remaining panels in the display device 10 to thereby provide the display device 10 with either an L-shaped display or a C-shaped display. This might be useful for some projects or if the space allotted for a project is limited.

Figure 3:
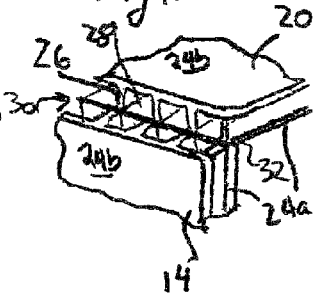
FIG. 3 is a fragmentary perspective view of one embodiment of a separation line running perpendicular to the corrugation in the display device in accordance with the invention.

As shown in FIG. 3, the sheet 12 is formed from opposed substantially planar layers of plastic or other appropriate material 24a, 24b connected by ribs 26 to thereby define cavities 28. The planar layers 24a, 24b may be substantially coextensive with one another, although portions of one or both planar layers 24a, 24b may be removed as discussed below.

To form the panels 14, 16, 18, 20, 22, vertically extending separation lines 30 are formed in the planar layer 24a on the rear side of the sheet 12, one separation line 30 will be present between each adjacent pair of panels (see FIG. 1B). The separation lines 30 extend from the bottom of the sheet 12 to the top of the sheet 12 to thereby partition the sheet 12 into the panels or horizontal sections. As used herein, a "horizontal section" is a part of the sheet 12 which extends between the upper and lower edges of the sheet 12 over only a portion of the width of the sheet 12. Each horizontal section or panel 14, 16, 18, 20, 22 extends from the bottom of the sheet 12 to the top of the sheet 12 to enable the sheet 12 to bend uniformly over its entire height.

The sheet 12 may be formed with the ribs 26 in either a vertical orientation, i.e.. extending vertically from a lower edge of the sheet 12 to an upper edge of the sheet 12, or in a horizontal orientation, i.e., extending horizontally from a left edge of the sheet 12 to the right edge of the sheet 12. FIGS. 3-7, 9 and 10 are taken when the ribs 26 are in a horizontal orientation (the separation lines 30 are thus perpendicular to the corrugation) whereas FIG. 11 is taken when the ribs 26 are in a vertical orientation (the separation lines 30 being parallel to the corrugation).

Figure 6:
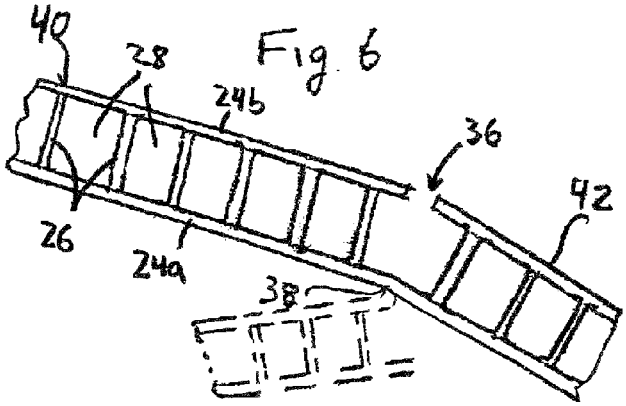
FIG. 6 is a fragmentary side view of a separation line running parallel to the corrugation in the display device in accordance with the invention.
Figure 7:
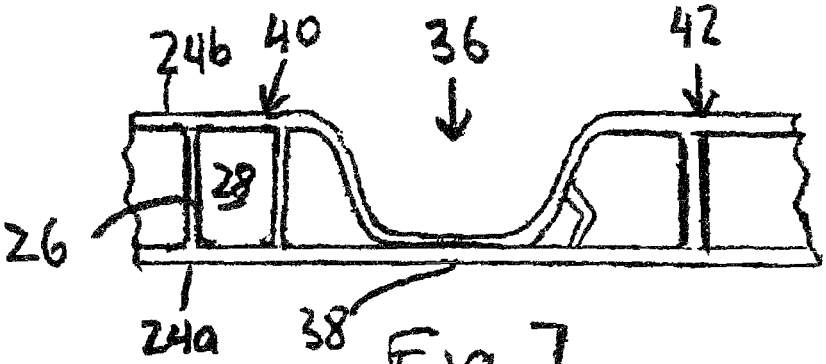
FIG. 7 is a fragmentary side view of another embodiment of a separation line running parallel to the corrugation in the display device in accordance with the invention.

Thus, as shown in FIG. 3, the separation lines 30 are constituted by a cut through the rear planar layer 24a and ribs 26. However, if the ribs 26 were in a vertical orientation, then the separation lines between panels 14, 16, 18, 20, 22 would be cuts in the rear planar layer 24a between a pair of adjacent ribs 26 (such as shown in FIG. 6). The separation lines 30 thus can be formed either parallel to the corrugation (between adjacent pairs of ribs 26) or perpendicular to the corrugation (through the ribs 26).

Instead of cutting the rear planar layer 24a, another way to form the separation lines 30 is to crush a portion of the sheet 12, i.e., press the rear planar layer 24a against the planar layer 24b on the front side of the sheet 12 with the result that the portion of the ribs 26 therebetween are crushed, and then heating the crushed portion to cause the rear planar layer 24a and crushed ribs 26 to melt onto the front planar layer 24b (see FIG. 4).

By forming the separation lines 30 in conjunction with only the rear planar layer 24a, the panels 14, 16, 18, 20, 22 remain attached to one another via the front planar layer 24b. Fold or hinge lines 32 are thus formed in the front planar layer 24b opposite the separation lines 30 in the rear planar layer 24a (see FIGS. 3 and 4). To improve the flexibility of the panels about the fold lines 32, the fold lines 32 may be scored, which is particularly preferable when the separation lines 30 are formed by the crushing technique. This enables the panels 14, 16, 18, 20, 22 to pivot forward around the fold lines 32 to thereby enable the compact configuration shown in FIG. 2 to be obtained.

The presence of the separation lines 30 formed in connection with the rear planar layer 24a and the fold lines 32 in the front planar layer 24b provides for easy changes in the configuration of the sheet 12 between the display configuration shown in FIG. 1 and the compact configuration shown in FIG. 2. To change from the display configuration to the compact configuration, the left side panel 20 is pivoted inward about the fold line 32 between it and the left center panel 14 while the right side panel 22 is pivoted inward about the fold line 32 between it and the right center panel 16. Then, with the left side panel 20 against the left center panel 14, the left center panel 14 is pivoted inward about the fold line 32 between it and the spine panel 18. With the right side panel 22 against the right center panel 16, the right center panel 16 is pivoted inward about the fold line 32 between it and the spine panel 18. The configuration shown in FIG. 2 is thereby obtained. To change from the compact configuration to the display configuration, the reverse movements are performed.

In the embodiment illustrated in FIG. 1B, the sheet 12 is partitioned into five panels 14, 16, 18, 20, 22. Nevertheless, it is conceivable that the sheet 12 may be partitioned into a different number of panels by forming the separation lines 30 and fold lines 32 in the rear and front planar layers 24a, 24b, respectively, at predetermined locations to arrive at the desired number and size of panels. The locations would be selected to enable folding of the sheet 12 about the fold lines 32 into a compact configuration.

Figure 1C:
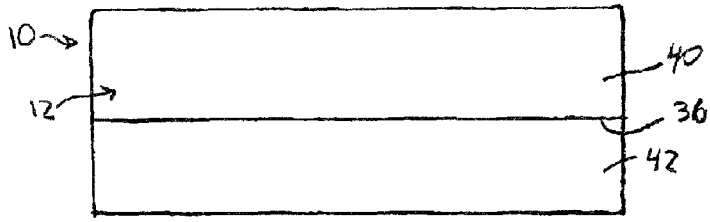
FIG. 1C is a front view of another embodiment of the portable display device shown in FIG. 1A.
Figure 1D:
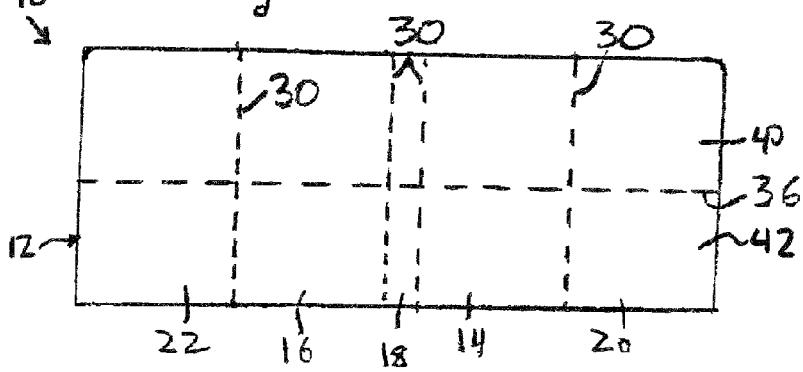
FIG. 1D is a rear view of still another embodiment of the portable display device shown in FIG. 1A.

Instead of or in addition to the vertically extending separation lines 30, the rear planar layer 24a of the sheet 12 may be provided with one or more horizontally extending separation lines 36 to enable it to be bent about a horizontal axis (see FIGS. 1C, 1D and 6). FIG. 1C shows the presence of a single horizontally extending separation line 36 without the vertically extending separation lines 30 whereas FIG. 1D shows the combination of both horizontally and vertically extending separation lines 30,36.

The separation lines 36, one of which is shown in FIGS. 1C and 1D, would extend entirely from the left edge of the sheet 12 to the right edge of the sheet 12 and may be constituted by a crimped bend or a cut in the rear planar layer 24a between pairs of adjacent ribs 26 (when the ribs 26 are oriented horizontally). In the alternative, the separation lines 36 may be formed by crushing a portion of the sheet 12, i.e., pressing the rear planar layer 24a against the front planar layer 24b with the result that any ribs 26 therebetween are crushed, and then heating the crushed portion to cause the rear planar layer 24a and crushed ribs 26 to melt onto the front planar layer 24b (see FIG. 7).

Horizontally extending fold lines 38 are formed in the front planar layer 24b opposite the separation lines 36 in the rear planar layer 24a. Fold lines 38 may constitute a series of serrations formed in the front planar layer 24b or be scored to facilitate folding of the sheet 12 about fold line 28.

Figure 5:
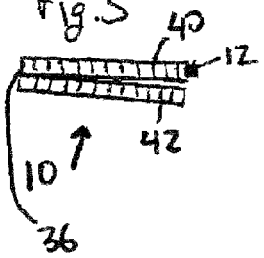
FIG. 5 is a side view of the portable display device shown in FIG. 1D in a second compact, carrying configuration.

The horizontally extending separation lines 36 and fold lines 38 enable the sheet 12 to be folded or bent to provide an alternative compact configuration, such as shown in FIG. 5. In this configuration, the sheet 12 is bent about the fold line 38, which would be formed in the middle of the sheet 12, heightwise, so that an upper vertical section 40 of the sheet 12 is folded against a lower vertical section 42 of the sheet 12 (see FIG. 6 wherein the folded position is shown in dotted lines). As used herein, a "vertical section" is a part of the sheet 12 which extends between the left and right edges of the sheet 12 over only a portion of the height of the sheet 12. Each vertical section 40, 42 extends from the left edge of the sheet 12 to the right edge of the sheet 12 to enable the sheet 12 to bend uniformly over its entire length. In view of the presence of separation lines 30 discussed above, the separation lines 36 may be discontinuous at the separation lines 30 and vice versa.

The separation lines 36 and opposed fold lines 38 can be arranged in any pattern, spacing and number to provide any desired degree of flexibility, although if multiple separation lines 36 and fold lines 38 are provided, they should be substantially parallel to one another.

The sheet 12 could thus be folded from the display configuration shown in FIG. 1A into either the compact configuration shown in FIG. 2 or the compact configuration shown in FIG. 5. Depending on the size of the sheet 12 and the position of the separation lines 30, 36 and opposed fold lines 32, 38, the configuration shown in FIG. 5 may be longer and narrower than the configuration shown in FIG. 2 so that it might be easier for a child to hold when in the position shown in FIG. 5.

The sheet 12 may be formed from one or more sturdy materials known to those skilled in the art including but not limited to plastic, cardboard, foam or treated paper. One suitable plastic is polypropylene. The sheet 12 can be formed to be entirely clear, transparent or translucent, or with a combination of clear, transparent and/or translucent portions. The front planar layer 24b may also be colored in various colors. Optionally, the front planar surface layer 24b may be formed from an erasable and washable material, which would enable its use as a writing board.

Several optional features may be incorporated into the sheet 12 to enhance and improve its use. One such feature is to round the corners of the rear planar layer 24a, the corners being defined by the upper and lower edges of the rear planar layer 24a and the separation lines 30 (see FIGS. 3, 8A and 8B). By rounding the corners, sharp edges are removed which prevents injury during handling of the display device 10. It is possible to round all (or possibly only some) of the edges of only the rear planar layer 24a (as shown in FIG. 8A wherein the front planar layer 24b is viewed through behind the rounded corners) or in the alternative, all of the corners of both the rear and front planar layers 24a, 24b (as shown in FIG. 8B).

Another feature would be to incorporate a flame retardant into the sheet 12 to prevent burning of the display device 10.

The display device 10 may be provided with several optional features to enhance its use. One feature is an attachment mechanism to maintain the display device 10 in the compact configuration shown in FIGS. 2 and 5. One such attachment mechanism is shown in dotted lines in FIG. 2 and comprises a strip 44 of hook-type fasteners arranged on the outer surface of the rear planar layer 24a of the left side panel 20 and a strip 46 of loop-type fasteners arranged on the outer surface of the rear planar layer 24a of the right side panel 22. During closing of the display device, the left and right side panels 20, 22 can be brought close to one another to cause engagement of the strips 44,46 and thus attachment of the left and right side panels 20,22 together. This would maintain the display device 10 in the compact configuration shown in FIG. 2.

Another feature which may be included in the display device is an attachment mechanism for attaching multiple display devices 10 together, e.g., when a tall poster board is needed. This attachment mechanism may comprise a strip 48 of hook or loop-type fasteners arranged on the outer surface of the rear planar layer 24a of the side and center panels 14, 16, 20, 22 on one display device 10 and a strap 50 having an area 52 of the other of the hook or loop-type fasteners arranged on the outer surface of the rear planar layer 24a of the side and center panels 14, 16, 20, 22 of another display device 10' (see FIGS. 9 and 10). To attach the display devices 10,10' together, the straps 50 are placed over the strips 48 to engage the hook and loop-type fasteners together (see FIG. 10).

Another attachment mechanism for attaching display devices 10,10' together, when the ribs 26 thereof are in a vertical orientation, may comprise pegs 54 insertable into the cavities 28 between the ribs 26 (see FIG. 11). The pegs 54 are only partially inserted into cavities in the lower display device 10 and then the upper display device 10' is positioned such that the pegs 54 align with cavities 28 and the display devices 10,10' are then pressed together with the pegs 54 partially in each display device 10, 10'. The pegs 54 are spaced along the adjoining surfaces of the display devices 10,10', preferably so that one peg 54 is present in each of the side and center panels 14, 16, 20, 22. Pegs 54 may be made from wood or plastic or the like and are dimensioned to snugly fit in the cavities 28.

Figure 12:
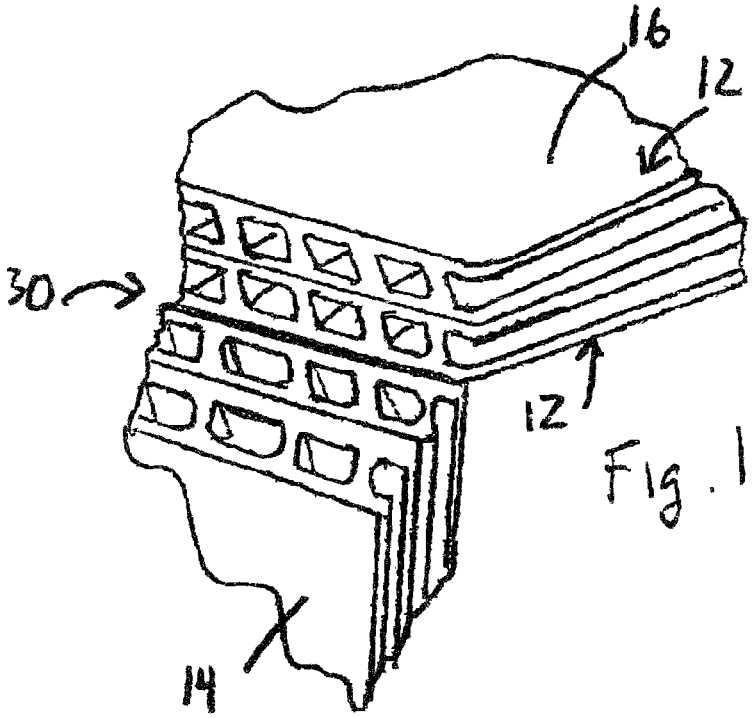
FIG. 12 is a fragmentary perspective view of a separation line running perpendicular to the corrugation in another embodiment of the display device in accordance with the invention.
Figure 13:
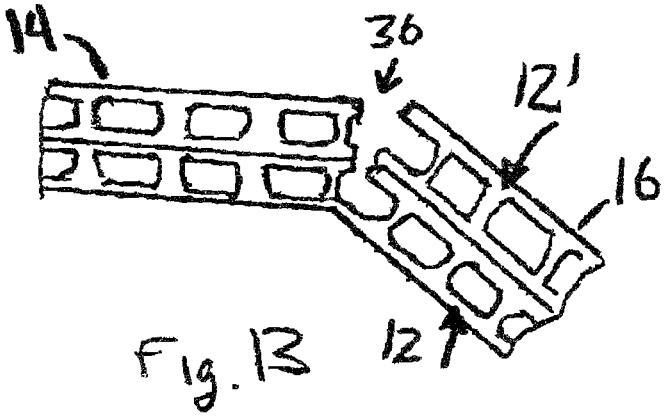
FIG. 13 is a fragmentary side view of a separation line running parallel to the corrugation in another embodiment of the display device in accordance with the invention.

Referring now to FIGS. 12 and 13, the display device 10 may comprise two sheets 12, 12' of corrugated plastic bonded to one another or formed integral with one another. FIG. 12 shows a separation line 30 between two panels 14, 16 when the ribs 26 are in a horizontal orientation, which would also be a separation line between two vertical sections when the ribs 26 are in a vertical orientation. FIG. 13 shows a separation line 38 between two panels 14, 16 when the ribs 26 are in a vertical orientation, which would also be a separation line between two vertical sections when the ribs 26 are in a horizontal orientation.

Instead of forming the display device 10 from a corrugated sheet 12, it is also possible to form the sheet 56 from a solid material (such as plastic or any of the other materials mentioned above) with living hinges formed in the rear. As shown in FIG. 14, the panels 14, 16 are separated by a living hinge 58 which constitutes a (vertical or horizontal) elongate portion of the sheet 56 with a reduced thickness.

Referring now to FIGS. 15 and 16, FIG. 15 shows an alternative rear view of the display device 10 shown in FIG. 1A. In this embodiment, the sheet 12 includes only vertically extending separation lines 30, and specifically only three such separation lines 30. One separation line 30 is arranged on the front planar layer 24b situated at the approximate middle of the sheet 12 with the other two being arranged on the rear planar layer 24a and situated at the approximate middle of the thus-formed halves of the sheet 12. Thus, there is no spine panel in this embodiment and the left center panel 14 is directly pivotally connected to the right center panel 16.

The display device shown in FIG. 15 is foldable into the W-shaped configuration shown in FIG. 16 wherein the panels 14, 16, 20, 22 fold about the fold lines 32 formed opposite the separation lines 30.

In view of the disclosure of the different embodiments above, it can be seen that the left and right center panels 14, 16 can be separated either by a single separation/fold line 30,32 (FIG. 15) or by two separation/fold lines 30,32 (FIG. 1D). It is also possible to provide more than two separation/fold lines 30,32 between the left and right center panels 30,32.

Accordingly, the number of separation/fold lines 30, 32 in the sheet 12 may be three (FIG. 15), or four (FIG. 1D) or more than four. If more than four vertically extending separation/fold lines 30, 32 are provided, the sheet 12 can be folded like an accordion into different shapes.

Figure 17:
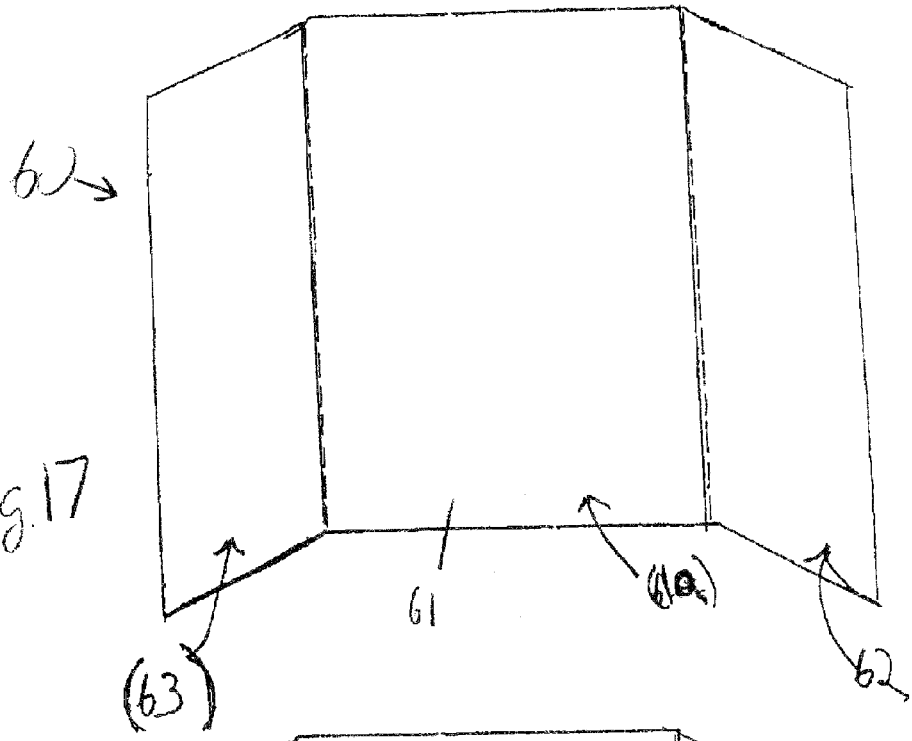
FIG. 17 is a front view of another embodiment of a display board in accordance with the invention.

Referring now to FIG. 17, another embodiment of a one-piece display board in accordance with the invention is designated generally as 60 and is reversible. By reversible, it is meant that both sides of the display board 60 can be used for display and presentation purposes. A presenter is thus able to use either one or both surfaces of the display board 60 in their presentation. This configuration will allow the presenter to display twice as much information, in comparison to display board which has only a single surface capable of display or presentation, or merely choose one side or the other for their presentation.

Figure 18:
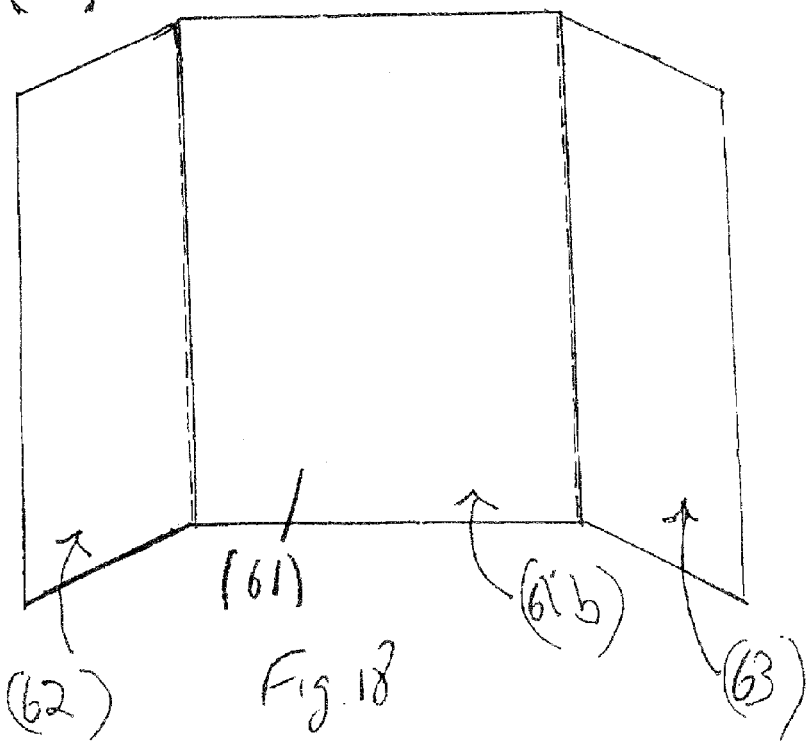
FIG. 18 is a rear view of another embodiment of a display board in accordance with the invention showing use of the reverse side of that shown in FIG. 17.

FIG. 17 shows a front side of the display board 60 having a center panel 61, a right side panel 62 and a left side panel 63 with a front surface of the center panel 61a being visible. In this embodiment, center panel 61 is not broken or partitioned by any core lines or fold lines or the like, and side panels 62, 63 each have a width slightly less than ½ of the width of the center panel 61 so that when folded over, they both fit alongside the center panel, i.e., for easy carrying and storage purposes. FIG. 18 shows the rear side of the display board with the surface of the center panel, i.e., the second display surface, being designated 61b.

This display board can be used in the manner by allowing the side panels 62, 63 to pivot around a vertical axis approximately 360 degrees. This configuration gives the displayer the choice of using either side of the display board 60 for additional display room, choice of colors or surfaces that will allow for different applications (permanent, washable, magnetic, etc.). That is, one side of the display board 60 can be colored one color and the other side can be colored another color. Also, one side of the display board 60 can be magnetized and the other side can be coated with a material that allows for application of permanent or washable markers. All different, possible combinations of colors and surface types are envisioned in the invention.

One significant difference between display board 60 and prior art constructions is that in this embodiment of the invention, the side panels 62, 63 can revolve freely for approximately 360 degrees, allowing either of the flat, broad surfaces to be used as the displaying surface. Plastic laminates or other washable surfaces can be used on either or both broad surfaces. By contrast, in a significant number of prior art display boards, the side panels are limited in their rotation relative to a center panel since only one side of the side panel is being used. Specifically, some are limited to a rotational movement that brings them close to but not parallel to the center panel (if the side panels were parallel to the center panel, support issues would arise).

The desired movement of the side panels may be achieved by unique cut scoring, double scoring, gapping with the use of laminate or score perforating. No known, existing display boards have the configurations nor stated function of the proposed invention. Any combination of the configurations shown in the drawings can also be used to accomplish the function.

Figure 19:
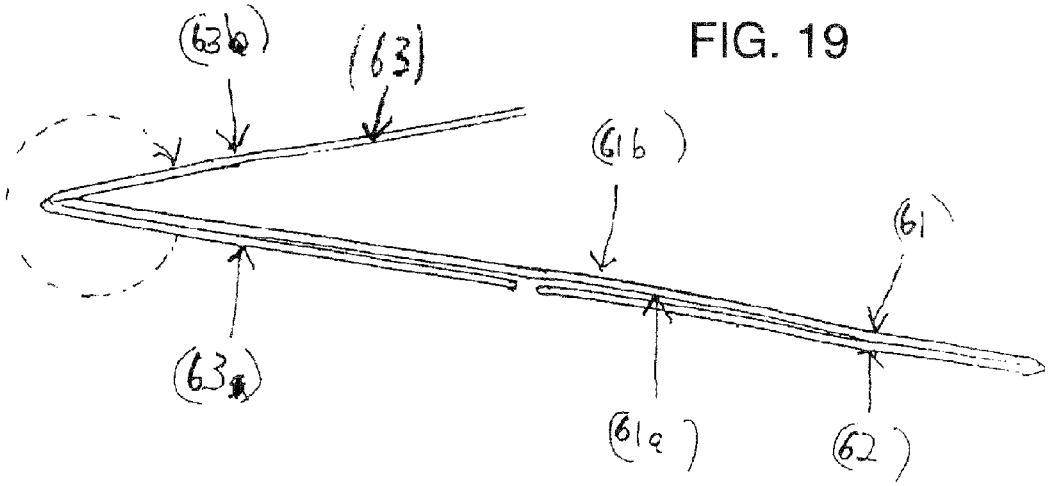
FIG. 19 is a top view showing rotation of the side panels of the display board shown in FIG. 17.

FIG. 19 shows a top view of the display board 60 with display surface 61a of the center panel 61, a second display surface 61b with side panels 62 and 63. Side panel 63 is shown to revolve in a vertical manner from position 63a to position 63b. This depicts the ability of side panels 63 to rotate approximately 360 degrees enabling both display surfaces to be used (side panel 63 rotates in the same manner).

Figure 20:
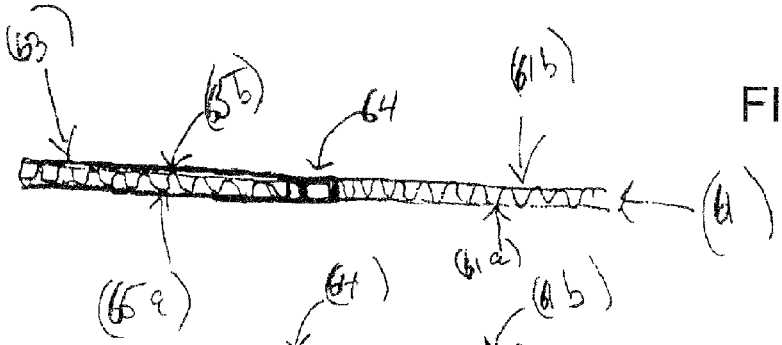

FIG. 20 is a top view showing a gap 64 between side panel 63 and center panel 61 that allows side panels 62 and 63 to revolve 360 degrees. Laminates 65a and 65b cover the surfaces. Thus, there is no corrugation in the gap 4 but rather there is one portion of corrugation in each side panel 62, 63 and then another, separate portion of corrugation in the center panel 61. However, the laminates which form the boundary for the corrugated portions extends through the gap 64 to connect the side panels 62, 63 to the center panel 61.

FIG. 20a is similar view to that shown in FIG. 20 but instead of the flutes of the corrugation in the center panel 61 and side panels 62, 63 being vertical, they are either horizontal or the display board is made of a solid material.

Figure 21:
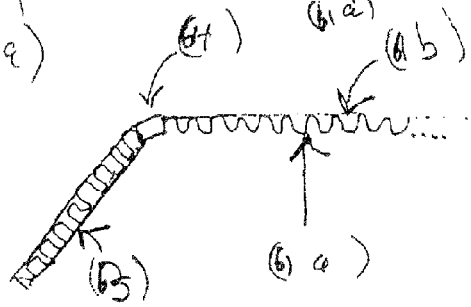

FIG. 21 shows a top view of display board 60 having corrugation as in FIG. 20 and in which side panel 63 is rotated to define an acute angle (less than 90 degrees) with the display surface 61a of the center panel 61 such that display surface 61a can thus be surface which is directed toward viewers.

FIG. 21a is a similar view to that shown in FIG. 21 but instead of the flutes of the corrugation in the center panel 61 and side panels 62, 63 being vertical, they are either horizontal or the display board is made of a solid material.

Figure 22:
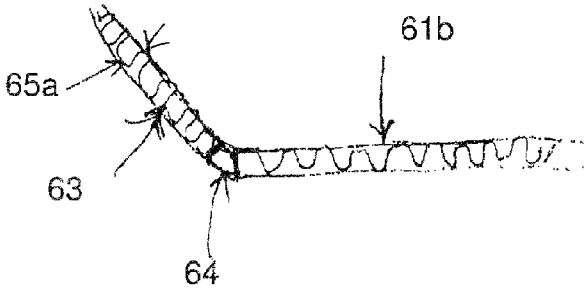

FIG. 22 shows a top view of display board 60 having corrugation as in FIG. 20 and in which side panel 63 is rotated to define an acute angle (less than 90 degrees) with the display surface 61b of the center panel 61 such that display surface 61b can thus be surface which is directed toward viewers.

FIG. 22a is a similar view to that shown in FIG. 22 but instead of the flutes of the corrugation in the center panel 61 and side panels 62, 63 being vertical, they are either horizontal or the display board is made of a solid material.

Figure 23:
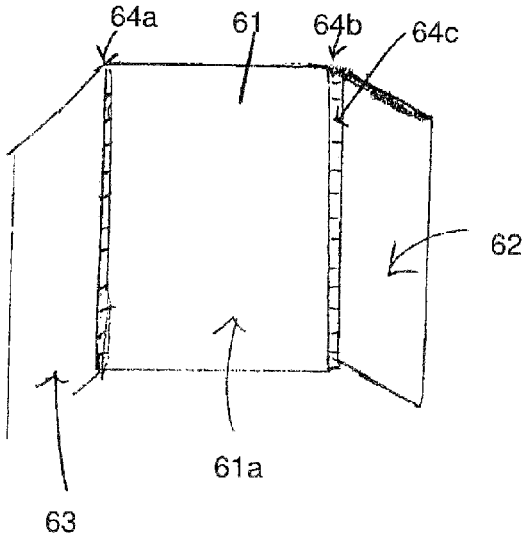
FIG. 23 is a front view showing another gap between adjacent of the display board shown in FIG. 17.

FIG. 23 is a view of a display board 60 in which shows a different type of gap between the side panels 62, 63 and the center panel 61. Gap 64b is a thin connection between the center panel 61 and the side panels 62, 63. Laminate covering the gap 64b is not shown.

Figure 24:
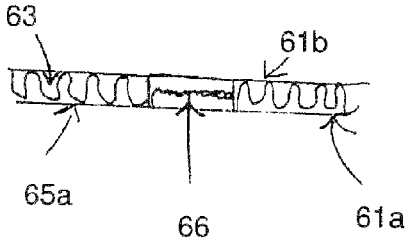

FIG. 24 is a top view of a portion of display board 60 in which shows another, different type of gap between the side panels 62, 63 and the center panel 61. The gap includes a section of crushed corrugated material 66 with laminates 65a, 65b being arranged on both sides but not connected thereto. Thus, the crushed corrugated material is between portions of the laminate 65a, 65b.

FIG. 24a is a similar view to that shown in FIG. 24, i.e., having the same construction of the gaps between the center panel 61 and side panels 62, 63, but instead of the flutes of the corrugation in the center panel 61 and side panels 62, 63 being vertical, they are either horizontal or the display board is made of a solid material.

Figure 25:
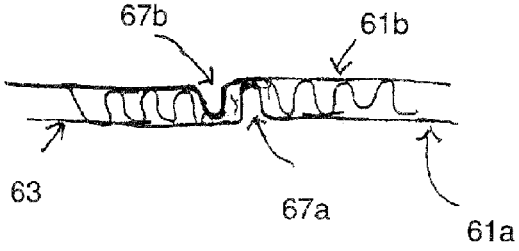

FIG. 25 is a top, cross-sectional view showing a portion of the display board 60 having a pair of deep scores proximate one another. Deep score 67a opens toward and alongside the display surface 61a while deep score 67b opens toward and alongside display surface 61b. Scores 67a, 67b are spaced apart from one another and, as shown, may be formed in adjacent grooves of the corrugated material, i.e., between or substantially parallel to flutes of the corrugations. Each score 67a, 67b may be formed by cutting the laminate partly or entirely between adjacent ridges of the corrugation or pressing the laminate over the groove in the corrugated material into the groove. Formation of the scores 67a, 67b facilitates the rotation of the side panels 62, 63 in both directions relative to the center panel 61, i.e., up to a 360 degrees rotation. Specifically, score 67a allows side panel 63 to move toward display surface 61b thereby allowing display surface 61b to be used. Similarly, score 67b allows side panel 63 to move toward display surface 61a thereby allowing display surface 61a to be used. Similar deep scores are also provided between side panel 62 and center panel 61 to enable side panel 62 to rotate over the same range.

FIG. 25a is a similar view to that shown in FIG. 25 but instead of the flutes of the corrugation in the center panel 61 and side panels 62, 63 being vertical, they are either horizontal, i.e., the scores 67a, 67b pass through the flutes, or the display board is made of a solid material.

Figure 26:
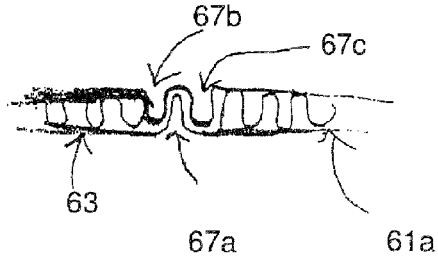

FIG. 26 is a top, cross-sectional view showing a portion of the display board 60 having an additional deep score 67c on the other side of score 67a and also opening toward display surface 61b. Scores 67a, 67b, 67c are spaced apart from one another and, as shown, may be formed in adjacent grooves of the corrugated material. Each score 67a, 67b, 67c may be formed by cutting the laminate partly or entirely between adjacent ridges of the corrugation or pressing the laminate over the groove in the corrugated material into the groove. The proximity of the scores 67a, 67b, 67c facilitates the rotation of the side panels 62, 63 in both directions relative to the center panel 61, i.e., up to a 360 degrees rotation.

FIG. 26a is a similar view to that shown in FIG. 26 but instead of the flutes of the corrugation in the center panel 61 and side panels 62, 63 being vertical, they are either horizontal or the display board is made of a solid material.

Figure 27:
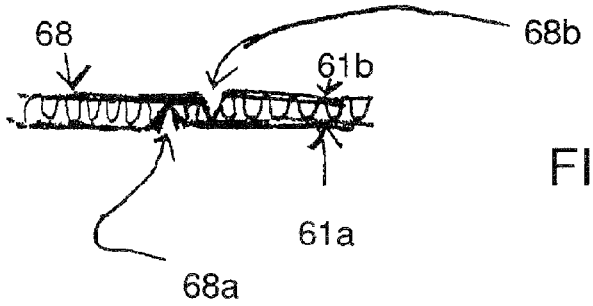
FIGS. 27, 27a, 28, 28a, 29 and 29a are top view showing other gaps or scores or cut scores between adjacent panels of a single-ply and multi-ply display board in accordance with the invention.

FIG. 27 is a top view of a portion of display board 60 showing cut scores 68a, 68b spaced apart from one another and which extend up to the laminate on the opposite side of the display board 60 from which the scores are made. Cut scores 68a, 68b cooperate, in view of their proximity to one another, to allow side panel 63 to rotate in both directions relative to center panel 61, i.e., up to a 360 degrees rotation. Similar cut scores are also provided between side panel 62 and center panel 61 to enable side panel 62 to rotate over the same range.

Figure 27A:
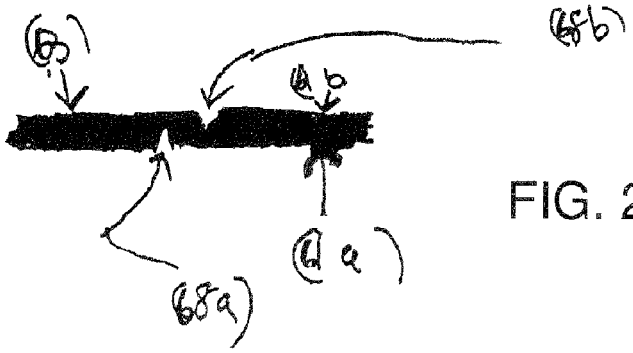

FIG. 27a is a similar view to that shown in FIG. 27 but instead of the flutes of the corrugation in the center panel 61 and side panels 62, 63 being vertical, they are either horizontal or the display board is made of a solid material.

Figure 28:
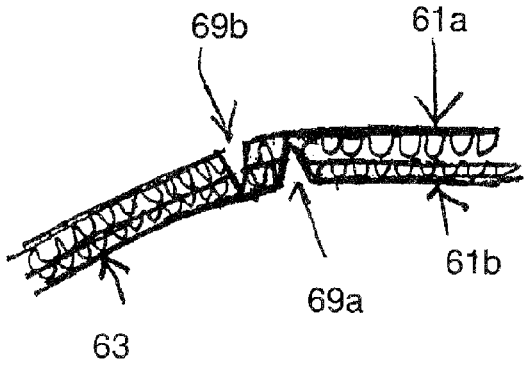

FIG. 28 is a top view of a portion of display board 60 showing cut scores 69a, 69b spaced apart from one another. In this embodiment, display board is a double-ply board. Cut scores 69a, 69b extend entirely through one ply, i.e., the ply on the side from which the cut is made, and up to but not through the laminate of the second ply. Cut scores 69a, 69b cooperate, in view of their proximity to one another, to allow side panel 63 to rotate in both directions relative to center panel 61, i.e., up to a 360 degrees rotation. Similar cut scores are also provided between side panel 62 and center panel 61 to enable side panel 62 to rotate over the same range.

Figure 28A:
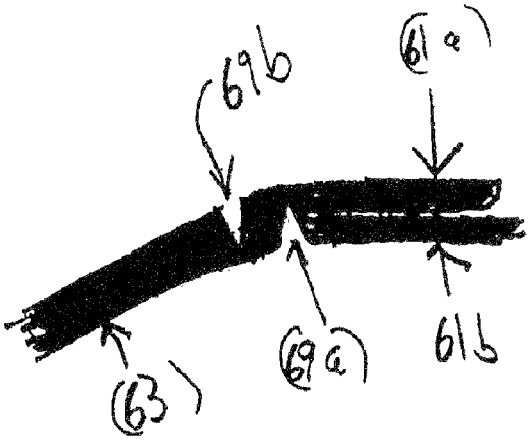

FIG. 28a is a similar view to that shown in FIG. 28 but instead of the flutes of the corrugation in the center panel 61 and side panels 62, 63 being vertical, they are either horizontal or the display board is made of a solid material.

Figure 29:
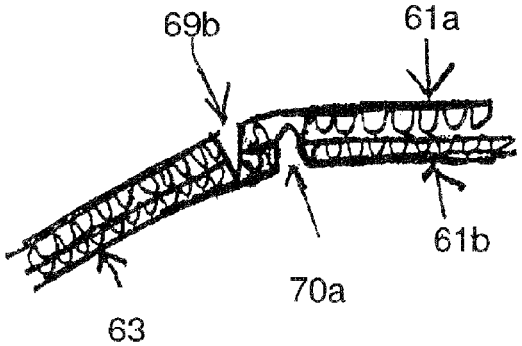

FIG. 29 is a top view of a portion of display board 60 similar to that shown in FIG. 28 but showing a deep score 70a instead of cut score 69a.

Figure 29A:
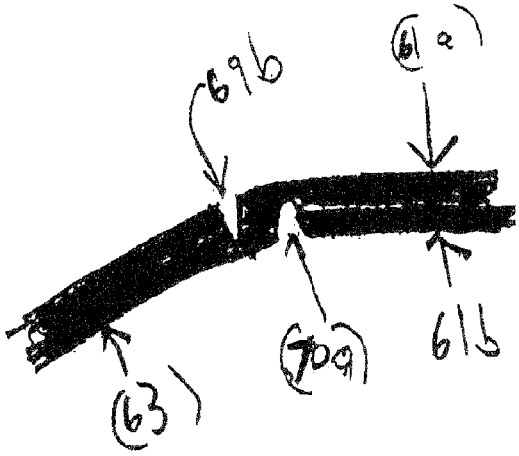

FIG. 29a is a similar view to that shown in FIG. 29 but instead of the flutes of the corrugation in the center panel 61 and side panels 62, 63 being vertical, they are either horizontal or the display board is made of a solid material.

As will be appreciated by one skilled in the art, deep scores and cut scores can be used interchangeably in any of the embodiment of the invention. Moreover, different formations of gaps between the various panels can be used in the same display board. There are thus numerous different display boards envisioned in the invention, including various combinations of surfaces, means to enable the panels to rotate relative to one another and means to connect adjacent panels to one another.

Referring now to FIGS. 30-33, another display board in accordance with the invention is designated generally as 80 and includes a top flap 82 which folds over the center panel 84, which is enabled by the presence of a cut score, deep score, slit, etc. (identified as 94 in FIGS. 30, 32 and 32a) in the front surface 92 of the display board 80. Alternatively, the cut score, deep score or slit 94 may be formed in the rear surface (and indeed this may be a preferred embodiment since other cut scores, deep scores or slits would also be formed in the rear surface). Display board 80 also includes side panels 86, 88 which may be connected to the center panel 84 in any of the ways described above. One of the primary functions of the flap 82 is to stabilize the display board 80 and traverse the seam 90 at the rear of the display board 80 in order to conceal the seam 90 (see FIG. 31). Seam 90 may be formed from one or more cut scores, deep scores, slits, etc. (preferably two as designated at 96 in FIG. 31), and the seam 90 should extend through the flap 82 to enable the display board to be folded into a compact configuration. However, in the flap 82, the cut scores, deep scores, slits, etc. may be only intermittent and not continuous.

An attachment mechanism is provided on the rear surface of the flap 82 and on the rear surface of the center panel 84 to secure the flap 82 in the "down" position in which is provides stability for the display board 80 in its operative position. The attachment mechanism may comprise a first piece 98 of hook or loop fasteners, e.g., of the VELCRO® type, attached to the rear surface of the center panel 84 at one or more locations and a second piece 100 of hook or loop fasteners, e.g., of the VELCRO® type, attached to the rear surface of the flap 82 at one or more locations, and obviously of the opposite type of fastener as used on the rear surface of the center panel 84 (see FIGS. 31-33). As shown in FIG. 32a, the flap 82 is not required to be restrained in order to provide stability to the display board.

Instead of hook and loop fasteners, other attachment mechanisms known to those skilled in the attachment art could be used in the invention including but not limited to, reusable glue or adhesive, double-sided tape wherein one side of covered with a detachable covering which is detached and adhered to the rear surface of the flap 82 when it is desired to position the flap 82 in its down position against the upper area of the center panel 84, and cooperating tabs and slots or slits.

However, it also possible to eliminate the attachment mechanism so that the flap 82 is unattached to the center panel 84 yet the flap 82 will still provide some stability to the display board 80 during use. Indeed, it is possible to construct the flap 82 so that it can be positioned in a near vertical position during use of the display board 80 so as to constitute a header onto which the user can place a title or the like related to the material being displayed or presented on the display board 80.

A flap as described above can be used in any of the embodiments of the display board described herein. The additional stability provides by the flap is useful whenever the display board is positioned into its presentation and display position with side panels angled relative to the center panel or panels.

Any cut scores, deep scores, slits, etc. formed in the display board 80 may be formed in any manner as described elsewhere herein. These cut scores, deep scores and slits may be useful when bending the flap and/or the display board for carrying and storage purposes. Fold lines may be optionally formed opposite each cut score, deep score, slit, etc. to aid in fold of the display board 80. Also, the cut scores, deep scores or slits may be formed with a blade having a serrated edge.

FIG. 34 shows one manner in which the seam 90 can be formed from two cut scores, deep scores, slits or the like, namely as a series of angled cuts. FIG. 35 shows the seam 90 being formed from a series of wavy cut scores, deep scores, slits or the like. These types of cut scores, deep scores or slits can be used in any of the embodiments herein.

FIG. 36 shows the formation of a cut score, deep score or slit which does not intersect with any of the edges of a panel. Rather, it ends about ⅛ inch up to ½ inch from the edge to thereby avoid cutting the edge and maintaining the strength of the edge. By contrast, FIG. 37 shows the cut score, deep score or slit intersecting the edges of the panel. Either of these techniques can be used in any of the display boards disclosed herein.

The reversibility of display board 80 enables it to be used multiple times and in a variety of different ways. It enhances its affordability and storability, i.e., ease of storage. Economic advantages include the ability to use two surfaces on a single display board whereas in prior art display boards, each is limited to one use and the user would have to purchase two boards in stead of one in accordance with the invention.

Moreover, when one of the surfaces of any of the display boards herein is plastic and capable of being washable, it can be used multiple times by simply washing off the old marker and making new displays.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A display board, comprising:

a substantially planar center panel having a front face, a rear face and a vertical fold or bend line extending between upper and lower edges of said front face that enables folding of said center panel about said fold or bend line;

a substantially planar left side panel pivotally connected to a left edge of said center panel, said left side panel having a front face;

a substantially planar right side panel pivotally connected to a right edge of said center panel, said right side panel having a front face;

rotation means for enabling said left and right side panels to rotate [almost 360°] relative to said center panel, said rotation means being arranged such that said left side panel is inwardly foldable relative to said center panel to enable said front face of said left side panel to face said front face of a first portion of said center panel on a first side of said fold or bend line and such that said right side panel is inwardly foldable relative to said center panel to enable said front face of said right side panel to face said front face of a second portion of said center panel on a second side of said fold or bend line; and a one-piece flap integrally connected to said upper edge of said center panel about a fold or bend line and spanning across said fold or bend line of said center panel such that said flap spans across portions of said center panel on both sides of said fold or bend line of said center panel, said flap including a fold or bend line aligning with said fold or bend line of said center panel and having a front face contiguous with said front face of said center panel, said [fold or bend line] *flap* being arranged to pivot rearward to stabilize the display board when said left and right side panels are arranged at an acute angle relative to said center panel, said flap being arranged relative to said center panel to provide the display board with a stable display state in which said front face of said center panel faces a forward direction, said front faces of said left and right side panels are arranged at an acute angle to said front face of said center panel and said flap is pivoted rearward about said fold or bend line between said flap and said center panel to be at an acute angle to said rear face of said center panel.

2. A display board, comprising:

a substantially planar center panel including a fold or bend line in an approximate middle region which enables said center panel to be folded, said fold or bend line extending between lower and upper edges of said center panel;

a substantially planar left side panel pivotally connected to a left edge of said center panel and having a width about ½ the width of said center panel such that said left side panel is foldable against said center panel;

a substantially planar right side panel pivotally connected to a right edge of said center panel and having a width about ½ the width of said center panel such that said right side panel is foldable against said center panel; and a one-piece flap integrally connected to said upper edge of said center panel about a fold or bend line, said flap including a flap fold or bend line aligning with said fold or bend line of said center panel and having a front face contiguous with said front face of said center panel, said flap being arranged to pivot rearward to stabilize the display board when said left and right side panels are arranged at an acute angle relative to said center panel, said flap having a first portion on one side of said flap fold or bend line and a second portion on the other side of said flap fold or bend line such that said flap spans across portions of said center panel on both sides of said fold or bend line of said center panel, said flap being arranged relative to said center panel to provide the display board with a stable display state in which said front face of said center panel faces a forward direction, said front faces of said left and right side panels are arranged at an acute angle to said front face of said center panel and said flap is pivoted rearward about said fold or bend line between said flap and said center panel to be at an acute angle to a rear face of said center panel.

3. The display board of claim 2, wherein said fold or bend line of said center panel is formed by a pair of parallel cut scores or deep scores optionally angled to one another or wavy.

4. The display board of claim 2, wherein said center, left side and right side panels and said flap are formed from a common substrate.

5. The display board of claim 2, further comprising attachment means for attaching said flap, at a location apart from said fold or bend line between said flap and said center panel, to a rear surface of said center panel.

6. The display board of claim 5, wherein said attachment means are arranged on at least one of a rear face of said flap and said rear face of said center panel.

7. The display board of claim 2, wherein said flap has a width equal to or less than a width of said center panels such that said flap does not extend alongside said left or right side panels.

8. The display board of claim 2, further comprising a cut score, deep score or slit formed in a rear surface of the display board at each of a fold or bend line between said left side panel and said center panel, a fold or bend line between said right side panel and said center panel, said fold or bend line between said center panel and said flap and said fold or bend line extending through said center panel and said flap.

9. The display board of claim 2, wherein said fold or bend line of said center panel is formed by a pair of parallel cut scores or deep scores optionally angled to one another or wavy and said flap fold or bend line only intermittently extends through said flap.

10. The display board of claim 4, further comprising a cut score, deep score or slit formed in a rear surface of and at said upper edge of said center panel to enable the rearward pivotal movement of said flap.

11. The display board of claim 5, wherein said attachment means comprise hook and loop fasteners.

12. The display board of claim 2, wherein:

a front surface of said center, left side and right side panels is made of the same material to enable display or presentation on said material, and a rear surface of said center, left side and right side panels is made of the same material to enable display or presentation on said material.

13. The display board of claim 12, wherein the material constituting the front surface of said center, left side and right side panels has at least one different property than the material constituting the rear surface of said center, left side and right side panels.

14. The display board of claim 2, further comprising rotation means for enabling said left and right side panels to rotate [almost 360°] relative to said center panel.

*15. The display board of claim 1, wherein said rotation means enable said left and right side panels to rotate almost 360° relative to said center panel.*

*16. A display board, comprising:*

*a substantially planar center panel having a front face, a rear face and a vertical fold or bend line extending between upper and lower edges of said front face that enables folding of said center panel about said fold or bend line;*

*a substantially planar left side panel pivotally connected to a left edge of said center panel, said left side panel having a front face;*

*a substantially planar right side panel pivotally connected to a right edge of said center panel, said right side panel having a front face;*

*rotation means for enabling said left and right side panels to rotate relative to said center panel, said rotation means being arranged such that said left side panel is inwardly foldable relative to said center panel to enable said front face of said left side panel to face said front*

*face of a first portion of said center panel on a first side of said fold or bend line and such that said right side panel is inwardly foldable relative to said center panel to enable said front face of said right side panel to face said front face of a second portion of said center panel on a second side of said fold or bend line; and*

*a one-piece flap integrally connected to said upper edge of said center panel about a fold or bend line and spanning across said fold or bend line of said center panel such that said flap spans across portions of said center panel on both sides of said fold or bend line of said center panel,*

*said flap including a fold or bend line aligning with said fold or bend line of said center panel and having a front face contiguous with said front face of said center panel,*

*said flap being arranged to pivot rearward or forward to stabilize the display board when said left and right side panels are arranged relative to said center panel such that a plane of each of said left and right panels is at an acute angle relative to a plane of said center panel,*

*said flap being further arranged relative to said center panel to provide the display board with a stable display state in which said front face of said center panel faces a forward direction, said front faces of said left and right side panels are arranged relative to said front face of said center panel such that a plane of each of said left and right panels is at an acute angle relative to a plane of said center panel and said flap is pivoted rearward or forward about said fold or bend line between said flap and said center panel such that a plane of said flap is at an acute angle relative to a plane of said center panel.*

*17. A display board, comprising:*

*a substantially planar center panel including a fold or bend line which enables said center panel to be folded, said fold or bend line extending between lower and upper edges of said center panel;*

*a substantially planar left side panel pivotally connected to a left edge of said center panel and having a width about ½ the width of said center panel such that said left side panel is foldable against said center panel;*

*a substantially planar right side panel pivotally connected to a right edge of said center panel and having a width about ½ the width of said center panel such that said right side panel is foldable against said center panel; and*

*a one-piece flap integrally connected to said upper edge of said center panel about a fold or bend line,*

*said flap including a flap fold or bend line aligning with said fold or bend line of said center panel and having a front face contiguous with said front face of said center panel,*

*said flap being arranged to pivot rearward or forward to stabilize the display board when said left and right side panels are arranged relative to said center panel such that a plane of each of said right and left side panels is at an acute angle to a plane of said center panel,*

*said flap having a first portion on one side of said flap fold or bend line and a second portion on the other side of said flap fold or bend line such that said flap spans across portions of said center panel on both sides of said fold or bend line of said center panel,*

*said flap being arranged relative to said center panel to provide the display board with a stable display state in which said front face of said center panel faces a forward direction, said front faces of said left and right side panels are arranged relative to said front face of said center panel such that a plane of each of said left and right panels is at an acute angle relative to a plane of said center panel and said flap is pivoted rearward or forward about said fold or bend line between said flap and said center panel such that a plane of said flap is at an acute angle relative to a plane of said center panel.*

*18. A display board, comprising:*

*a substantially planar center panel having a front face, a rear face and a vertical fold or bend line extending between upper and lower edges of said front face that enables folding of said center panel about said fold or bend line;*

*a substantially planar left side panel pivotally connected to a left edge of said center panel, said left side panel having a front face;*

*a substantially planar right side panel pivotally connected to a right edge of said center panel, said right side panel having a front face;*

*rotation means for enabling said left and right side panels to rotate relative to said center panel, said rotation means being arranged such that said left side panel is inwardly foldable relative to said center panel to enable said front face of said left side panel to face said front face of a first portion of said center panel on a first side of said fold or bend line and such that said right side panel is inwardly foldable relative to said center panel to enable said front face of said right side panel to face said front face of a second portion of said center panel on a second side of said fold or bend line; and*

*a one-piece flap integrally connected to said upper edge of said center panel about a fold or bend line and spanning across said fold or bend line of said center panel such that said flap spans across portions of said center panel on both sides of said fold or bend line of said center panel,*

*said flap including a fold or bend line aligning with said fold or bend line of said center panel and having a front face contiguous with said front face of said center panel,*

*said flap being arranged to pivot rearward or forward to stabilize the display board when said left and right side panels are arranged at an acute angle relative to said center panel,*

*said flap being arranged relative to said center panel to provide the display board with a stable display state in which said front face of said center panel faces a forward direction, said front faces of said left and right side panels are arranged at an acute angle to said front face of said center panel and said flap is pivoted rearward or forward about said fold or bend line between said flap and said center panel to be at an acute angle to said rear face or said front face of said center panel.*

*19. A display board, comprising:*

*a substantially planar center panel including a fold or bend line in an approximate middle region which enables said center to be folded, said fold or bend line extending between lower and upper edges of said center panel;*

*a substantially planar left side panel pivotally connected to a left edge of said center panel and having a width about the width of said center panel such that said left side panel is foldable against said center panel;*

*a substantially planar right side panel pivotally connected to a right edge of said center panel and having a width about the width of said center panel such that said right side panel is foldable against said center panel; and*

*a one-piece flap integrally connected to said upper edge of said center panel about a fold or bend line,*

*said flap including a flap fold or bend line aligning with said fold or bend line of said center panel and having a front face contiguous with said front face of said center panel,*

*said flap being arranged to pivot rearward or forward to stabilize the display board when said left and right side panels are arranged at an acute angle relative to said center panel,*

*said flap being arranged to pivot rearward or forward to stabilize the display board when said left and right side panels are arranged at an acute angle relative to said center panel,*

*said flap being arranged relative to said center panel to provide the display board with a stable display state in which said front face of said center panel faces a forward direction, said front faces of said left and right side panels are arranged at an angle to said front face of said center panel and said flap is pivoted rearward or forward about said fold or bend line between said flap and said center panel to be at an acute angle to said rear face or said front face of said center panel, said flap having a first portion on one side of said flap fold or bend line and a second portion on the other side of said flap fold or bend line such that said flap spans across portions of said center panel on both sides of said fold or bend line of said center panel,*

*said flap being arranged relative to said center panel to provide the display board with a stable display state in which said front face of said center panel faces a forward direction, said front faces of said left and right side panels are arranged at an acute angle to said front face of said center paned and said flap is pivoted rearward or forward about said fold or bend line between said flap and said center panel to be at an acute angle to a rear face or front face of said center panel.*

* * * * *